Aug. 6, 1940.　　　C. L. JOHNSON　　　2,210,082
HEAT METERING APPARATUS
Filed Oct. 16, 1937　　　2 Sheets-Sheet 1
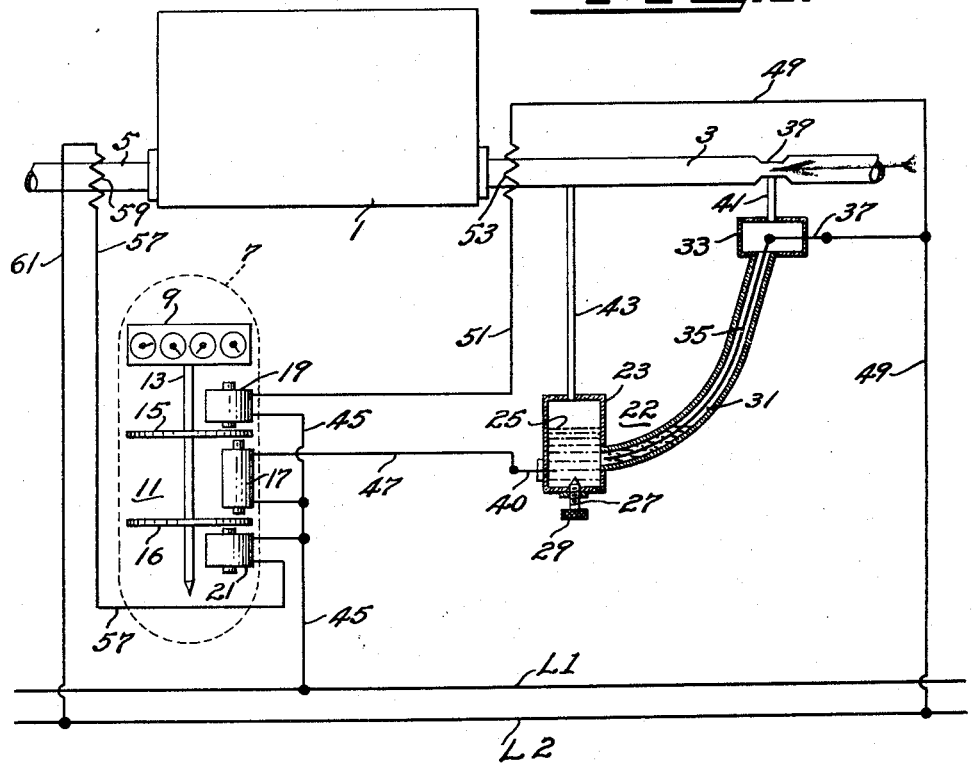
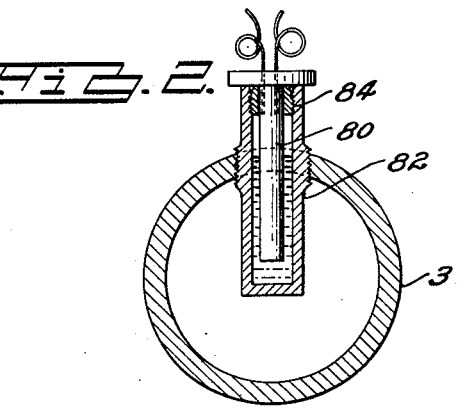
INVENTOR.
Cecil L. Johnson
BY
F. D. Hicks
ATTORNEY.

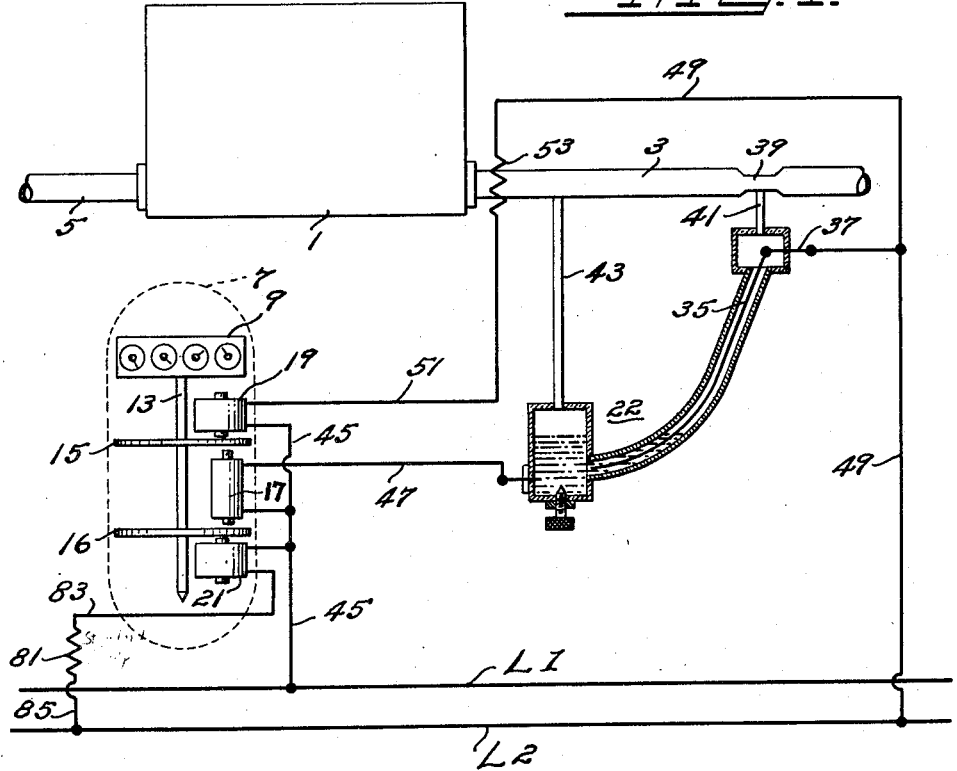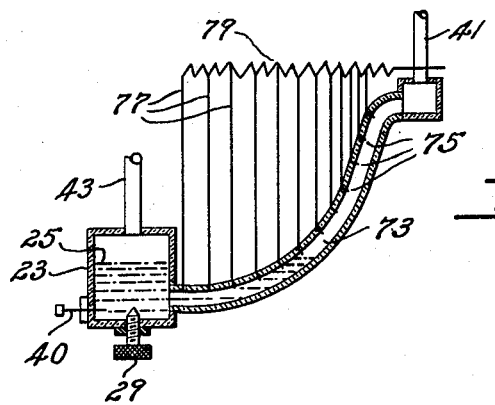

Patented Aug. 6, 1940

2,210,082

UNITED STATES PATENT OFFICE 2,210,082

HEAT METERING APPARATUS

Cecil L. Johnson, Toledo, Ohio, assignor to The Indemse Corporation, a corporation of Michigan Application October 16, 1937, Serial No. 169,351

6 Claims. (Cl. 73—193)

My invention pertains to electrical measuring apparatus for providing an integrated indication of a plurality of variable conditions, and more particularly to a metering system for measuring the heat units emitted or absorbed by apparatus for heating, cooling, conducting chemical processes and the like. The present invention is a substantial improvement on the applicant's heat metering apparatus disclosed in his prior Patent Number 1,948,234 granted February 20, 1934.

The centralized heating industry has been seriously handicapped by the lack of simple, reliable apparatus for automatically providing an accurate metered indication of the heat energy supplied to each customer, similarly as the gas, water and electric utilities have satisfactory meters for this purpose. Instead the centralized heating service has generally been restricted either to charging a flat rate or to computing the heat units supplied to each customer by utilizing the apparatus available for separately measuring the rate of flow of the heating fluid and the temperature difference as it passes into and out of the heating apparatus or the premises, or a combination thereof. Because of the tendency of some customers to waste heat the flat rate must be high enough to cover such waste and is unsatisfactory to the public generally because it penalizes all to pay for those who waste heat.

In addition to the lack of a satisfactory heat unit meter for giving a single integrated indication of heat units, thus necessitating computation of the quantity to be determined, the centralized heating industry has been further handicapped as apparatus available for this purpose has been unsatisfactory because of complication, size, inaccuracy, high expense of first cost and maintenance, inadequate range and other factors.

It is accordingly an object of my invention to provide a metering system of improved accuracy, simplicity and economy comprising a polyphase alternating current watt-hour meter, or similar device, which is well known and generally accepted as reliable, and which is operable in my simplified system on the alternating current service mains, which are generally available, to provide a directly integrated indication of a plurality of related non-electrical quantities or conditions.

It is also an object of my invention to provide a measuring system comprising an integrating register mechanism, and motive means for driving the register mechanism comprising, a plurality of windings energized separately in response to varying conditions or quantities and including a winding energized in accordance with the variations of one of said quantities and two additional windings acting in opposition and energized according to two different values of another quantity to be measured to provide an effect which is a function of the difference.

It is a further object of my invention to provide a heat metering system comprising, a heat exchanger, conduit means for conducting fluid into and away from the heat exchanger, a three-wire watt-hour meter, an electrical resistor variable in accordance with the rate of fluid flow through the heat exchanger, circuit means for energizing the potential winding of the watt-hour meter through the flow varied resistor, additional resistors separately variable in accordance with the inlet and the outlet temperatures of the fluid flowing through the heat exchanger, and circuit means for energizing the current windings in opposing relation through the respective temperature varied resistors to set up a differential effect in the meter, and provide an integrated indication of the heat units emitted or absorbed by the fluid.

Another object of my invention is to provide a heat metering system for measuring the heat units carried by a flowing stream of fluid comprising, integrating registering means operating by flow controlled means responsive to the rate of fluid flow and by cooperative temperature controlled means responsive to the temperature of the fluid as compared to the effect of a standard means selected to represent a predetermined base temperature.

Further objects and advantages are within the scope of my invention such as relate to the arrangement, operation and function of the related elements, to various details of construction and combinations of parts, elements per se, and to economies of manufacture and numerous other advantages as will be apparent from a consideration of the specification in conjunction with the appended drawings disclosing embodiments of my invention, similar reference characters designating similar parts throughout, in which:

Fig. 1 is a view, partially diagrammatic, showing my improved heat metering system;

Fig. 2 is a detail sectional view showing a modified arrangement of the resistance thermometer;

Fig. 3 is an enlarged view, partially diagrammatic, showing another embodiment of the resistor connection in the manometer; and Fig. 4 is a diagrammatic view showing another embodiment of my heat metering system.

Referring more particularly to Fig. 1 of the drawings, I have illustratively disclosed my improved heat metering apparatus installed for use in connection with any heat exchanger device 1 through which a fluid is circulated through supply conduits 3 and 5, either conduit serving as an inlet conduit for conducting the fluid into the heat exchanger and the other conduit serving to carry the fluid away. The heat exchanger may be any well known type of radiator heated to a higher temperature than the surrounding air by a heating fluid such as hot water flowing through the conduits 3 and 5 from a central heating plant, for emitting heat to heat a building, in the usual manner.

For metering the heat energy emitted by the radiator 1, I provide a polyphase watt-hour meter 7 of the usual induction-type construction. Such instruments generally comprise an integrating register mechanism 9 which is driven by a rotor 11 consisting of a rotatable shaft 13 supporting a plurality of metallic discs in axially spaced relation thereon. The integrating watt-hour meter 7, which I preferably use for integrating heat units in such a system, is a polyphase instrument of the three-wire or three-phase type having two metallic disks 15 and 16 supported on the shaft 13, and a potential coil or winding 17 disposed adjacent the disks 15 and 16 for exposing the disks to an alternating electromagnetic field inducing eddy currents therein, in a well known manner.

Watt-hour meter 7 also has series or current coils or windings 19 and 21 disposed adjacent the respective disks for setting up alternating fields which simultaneously react upon the eddy currents induced in the disks by the potential coil 17 to provide forces tending to rotate and/or retard the rotor, in the manner common in polyphase watt-hour meters. Such instruments are available on the market, and the construction and operation being well known, further description thereof is considered unnecessary. If desired, the current windings 19 and 21 may be rewound to reduce the necessary measuring current, and sufficient corrective capacity provided to maintain the phase angle, the term "current winding" referring either to such windings as regularly provided or as rewound.

In my heat metering system the potential coil 17 of the polyphase watt-hour meter is energized in accordance with the rate of fluid flow through the heat exchanger 1 by means of a resistance varying manometer which may be of usual construction. For accuracy and sensitivity on low rates of flow, I preferably provide a uniform varying manometer 22 comprising a mercury chamber 23 of glass or other suitable material, holding mercury 25 the level of which may be conveniently adjusted by means of a screw 27 which passes threadably through the bottom or side wall of the chamber and has a knurled head 29 projecting for convenient manipulation.

Opening through and extending from one side of the side wall of the mercury chamber, below the level of the mercury, is a curved measuring tube 31. The measuring tube 31 is made of any suitable electrical insulating material, such as glass, and as it extends horizontally from the mercury chamber 23 it is curved upwardly in suitable increments to define a pressure flow curve, for a purpose to be subsequently described. At its uppermost end the measuring tube 31 opens into a chamber 33, also of glass or other suitable insulating material.

To provide an electrical resistance varying uniformly with fluid flow, an electrical resistor 35 is disposed in the measuring tube where it extends from the mercury in the mercury chamber 23 up to the chamber 33 at the upper end of the tube 31. At its upper end the resistor connects with a conductor member 37, which passes through the wall of the upper chamber 33 in hermetically sealed relation, for connection with external circuits. An electrode conductor 40 passes through the side wall of the mercury chamber 23 in sealed relation to provide a conductive connection from the mercury to an external circuit. The resistor element 35 is selected to provide a suitable resistance variation for regulating the energization of the potential coil 17, as will be understood.

To obtain a substantial pressure difference varying as a function of the rate of fluid flow, one of the supply conduits 3 is provided with a flow restriction 39, which may be provided by a Venturi tube or an orifice plate, as will be understood. From the flow restriction 39 a conduit 41 connects into the upper chamber 33 of the manometer, and from the mercury chamber 23 a pipe 43 connects into the conduit 3.

As the fluid flows through the conduit 3 and its flow restriction means 39, pressure differences are set up which vary as a function of the rate of flow in accordance with Bernoulli's theorem. The manometer 22 receives the different pressures thus produced through the connections 41 and 43, whereby the mercury is depressed in the mercury chamber 23 and it rises in the measuring tube 31. Because of the shape of the measuring tube 31, which corresponds to a flow pressure curve, the length of the mercury column in the tube varies directly proportional to the variation in the rate of fluid flow. Since the resistance of the electrical resistor element 35 varies directly with the length, its resistance will also be varied as a straight line function of the fluid flow.

For energizing the potential coil 17 of the watt-hour meter, one terminal thereof is connected through a conductor 45 to a conductor L1 which may be one of the conductors of any convenient alternating current service line. From the other terminal of the winding 17 a conductor 47 is connected to the electrode 40 on the manometer, and from the terminal conductor 37 thereof a conductor 49 connects to the other service line conductor L2. The potential winding energizing circuit may be traced from the main line conductor L1, through conductor 45 to one terminal of winding 17, thence by way of conductors 47 and 40 through the mercury 25, resistor 35, and conductors 37 and 49 to the other line conductor L2. In this circuit the potential winding of the watt-hour meter is energized in accordance with the volume or quantity of fluid passing through the heat exchanger 1.

To energize the current or series winding 19 of the watt-hour meter in accordance with the temperature of the fluid flowing in one of the supply conduits 3, a conductor 51 is connected from one of the terminals of this winding to a terminal of a resistance thermometer 53, which is a resistance wire of a metal or alloy having a high temperature coefficient of resistance which is disposed in close thermal coupled relation on the conduit. For this purpose the wire of resistance 53 may be disposed in any suitable form for clamping it around the conduit 3 or it may be wound thereon in suitably insulated turns, as will be readily understood, and heat insulation material is preferably provided thereon in order that the outer surface of the conduit may be insulated from the atmosphere and therefore at substantially the same temperature as the temperature of the fluid in the conduit.

If desired the temperature variable electrical resistors may be inserted into the conduits for more intimate thermal association with the fluid. A well known arrangement for this purpose, as shown in Fig. 2, comprises a small shell 80 of conductive material inserted concentrically into a shell 82 of large diameter in which it is supported, as by a large threaded collar 84 at the outer end. The electrical resistor is disposed in the smaller shell 80 and the space surrounding may be filled with a heat conductive medium such as oil. The larger shell 82 is suitably threaded to be inserted and supported in a threaded aperture in the side of the conduit 3.

The other terminal of the resistance thermometer 53 is connected to conductor 49 and thence to the main line conductor L2. The conductor 45 connects from the other main line conductor L1 to the other terminal of the temperature controlled current winding 19 which is thus energized in accordance with the temperature of the fluid flowing in conduit 3 through the energizing circuit comprisng main line conductor L1, conductor 45, winding 19, conductor 51, resistance thermometer 53, conductor 49 to main line L2.

The other current winding 21 of the polyphase watt-hour meter is also joined at one terminal to the conductor 45 connecting from the line conductor L1. From the other terminal of the winding 21 a conductor 57 connects to one terminal of a resistance thermometer 59, which is similar to the resistance thermometer previously described, but which is disposed in close thermal coupled relation to the fluid flow conduit 5 whereby its resistance is varied in accordance with the temperature of the fluid flowing therein. From the other terminal of the resistance thermometer 59 a conductor 61 connects to the other service conductor L2.

The current or series windings 19 and 21 of the watt-hour meter are so connected that they act upon the rotor 11 in opposing relation, and the rotation of the rotor is proportional to the difference of the effects produced.

Operating as a heating system, under normal conditions heat is emitted from heat exchanger 1, and if it be assumed that supply conduit 3 is the inlet conduit, then the resistance thermometer 53 will be heated to a higher temperature and hence to a higher resistance than the resistance thermometer 59. Under this condition the current passing through resistance thermometer 59 to the current winding 21 will be greater than the current passing through resistance thermometer 53 and winding 19, and the rotor will be driven by the greater effect of winding 21 thereon, which effect will be proportional to the difference between the temperatures of the fluids in the two conduits 3 and 5.

The torque tending to drive the rotor is produced by the magnetic fields of the currents coils 19 and 21 acting on the eddy currents set up in the disks by the potential coil 17, and since the energization of the potential coil is varied in accordance with the rate of fluid flowing through the heat exchanger 1, the resultant torque tending to rotate the rotor in a given direction is proportional to the product of temperature difference and fluid flow. The register mechanism 9 is thus driven to register in proportion to the heat units emitted.

If the fluid entering the heat exchanger is of the same temperature as the fluid leaving it, the effects of the current windings on the rotor will be equal and opposite, and no relation will be caused. Under this condition no heat has been emitted from the fluid, and hence there are no heat units to be registered.

Assuming the thermometer resistors have positive temperature co-efficients, when connecting the current windings 19 and 21 of the watt-hour meter, it is important to so connect one of these windings through the coldest resistance thermometer that its effect in conjunction with the connected potential winding 17 is to turn the rotor in the proper direction for driving the register mechanism 9. The effect of the other current winding which is connected in opposing relation through the hot resistance thermometer will be less and it will not reverse the rotor but will only tend to slow it. If the direction of fluid flow is reversed in the heat exchanger, the proper direction of rotation of the watt-hour meter may be maintained by properly reversing the connections of the windings, as will be understood. When a vapor heating medium is supplied through conduit 3, the resistance thermometer 59 measures the temperature of the condensate and the system is suitablly adjusted to meter the total heat units emitted. If the system is one wherein heat is absorbed by the fluid, the same rule must be followed in connecting one of the current windings through the coldest resistance thermometer to drive the rotor forward. Hence, it will be seen that my heat metering system is readily adaptable to different conditions of fluid flow and heat emission or absorption.

As shown in Fig. 3, the manometer may be provided with a curved measuring tube 73 which has a plurality of conductive contacts 75 sealed in and extending through one side thereof. The contacts 75 connect with taps 77 extending from a resistor 79 and arranged so that the portions of the resistor 79 are shorted out, as the mercury rises in the measuring tube 73. The measuring arm 73 is curved to correspond to a pressure flow curve and provides a manometer which is sensitive to low rates of flow, as in the embodiment previously described. A sufficient number of taps and contacts are installed to provide the desired degree of accuracy, and the resistor 79 is selected to obtain the desired capacity and range of resistance variation.

Fig. 4 relates to another embodiment of my invention wherein I provide for measuring the heat units carried by a flowing fluid by comparison with a selected base temperature.

In this embodiment of my heat metering apparatus I utilize an integrating device such as a polyphase watt-hour meter 7 similar to that previously described. As shown, the potential winding 17 of the watt-hour meter 7 is energized from alternating current service line conductors L1 and L2 in accordance with the rate of fluid flow through a heat exchanger 1, in a manner similar to that previously disclosed with reference to the first embodiment described, the restriction means 39 being suitably selected for metering vapor. Also the current winding 19 of the watt-hour meter is similarly energized in accordance with the temperature of the fluid flowing into the heat exchanger 1 through the conduit 3.

However, in this second embodiment, the energization of the other current winding 21 is accomplished in a different manner. For controlling the energization of the current-winding 21, I select a resistor 81 which has a constant resistance equal to the resistance which the variable resistance thermometer 59 in Fig. 1 would have at a temperature which is the temperature to be used as base or standard temperature. From one terminal of the current winding 21 a conductor 83 is connected to one terminal of the constant resistor 81 and the energizing circuit continues from the other terminal of resistor 81 by way of a conductor 85 to the service line conductor L2.

The complete energizing circuit of winding 21 may then be traced from service conductor L1, through conductor 45, winding 21, conductor 83, resistor 81, and conductor 85 to the other service conductor L2.

The current winding 21, which is connected to oppose current winding 19, is thus constantly energized to produce a predetermined effect corresponding to the base temperature to which the temperature of the intake-fluid is to be compared.

This embodiment of my heat metering system is especially advantageous in heat transfer systems utilizing a vapor medium for the heat transporting fluid. In such systems, the resistor 81 is selected for passing a current through the current winding 21 to produce an effect corresponding to the congealing temperature of the medium used. In a steam heating system, for example, a base temperature of 32 degrees Fahrenheit is preferable, as the total heat content of steam is commonly computed from this base.

In operation the fluid flowing through the conduit 3 sets up a pressure differential which operates the manometer 22 and controls and varies the degree of energization of the potential winding 17 of the watt-hour meter as previously described. The energization of the current winding 19 of the watt-hour meter is controlled and varied by the resistance thermometer 53 in accordance with the temperature of the flowing fluid.

The current winding 21 of the watt-hour meter is constantly energized through the resistor 81 to produce an effect which corresponds to the effect that would be produced by winding 21 in Fig. 1 when its controlling resistance thermometer 59 is chilled to the base temperature. As in Fig. 1, the windings 19 and 21 of the meter are connected in opposing relation, and the rotor is driven by the difference of these simultaneously acting effects in conjunction with the effect of the flow controlled winding 17, the winding 21 driving the rotor forward.

The winding 19 is so connected that in cooperation with winding 17 it tends to retard the movement of the rotor. This retarding effect varies and decreases as the temperature of the fluid rises thus permitting the rotor to turn faster, because the character of resistance thermometer 53 is such that it increases its resistance with increasing temperature.

Increasing flow operates the manometer 22 to increase the energization of the potential coil 17 and to thereby speed up the operation of the rotor, as in the previously described embodiment.

In either embodiment my heat metering apparatus can be readily calibrated by the usual well known methods as by operating it under standard known conditions and determining a proper factor for converting the register readings into any desired heat units. Also if desired the system may be arranged by proper arrangement of register mechanism ratio or selection of resistors and circuit constants to provide for direct reading as will be readily understood.

Although I have described the application of my heat metering system more particularly in conjunction with a heating system, it is to be understood that it may be conveniently applied in a similar manner to be very advantageously utilized in conjunction with water superheaters, chemical processing apparatus, in systems for selling condenser water on a basis of heat units removed, in centralized cooling systems for air conditioning and refrigeration, and that the heat exchanger 1 as referred to is any such heat transfer apparatus.

It is apparent that within the scope of my invention, modifications and different arrangements may be made other than herein disclosed, and the present disclosure is illustrative merely, the invention comprehending all variations thereof.

I claim:

1. In a heating metering system, the combination of a heat exchanger having inlet and outlet conduits for passing a heating medium therethrough, an integrating register mechanism having a rotary shaft for operating the same, a pair of conductive rotor members mounted upon said shaft in spaced relation, means for inducing in each of said rotor members an alternating magnetic flux variable in amplitude in accordance with the rate of flow of heating medium through said exchanger, means for inducing in one of said rotor members a second alternating magnetic flux which cooperates with the first magnetic flux to produce a torque on the rotor member tending to rotate said shaft in one direction, and means for inducing in the second of said rotor members a second alternating magnetic flux which cooperates with the first magnetic flux induced therein to produce a torque on the second rotor member tending to rotate said shaft in the opposite direction, and means for variably controlling the amplitude of one of said second magnetic fluxes in accordance with variations in temperature of the heating medium flowing through said exchanger.

2. A heat metering system according to claim 1 in which the remaining second magnetic flux induced in one of the rotor members is maintained at a substantially constant magnitude.

3. In a heat metering system, the combination of a heat exchanger having inlet and outlet conduits for passing a heating medium therethrough, an integrating register mechanism having a rotary shaft for operating the same, a pair of conductive rotor members mounted upon said shaft in spaced relation, means for inducing in each of said rotor members an alternating magnetic flux variable in amplitude in accordance with the rate of flow of heating medium through said exchanger, means for inducing in one of said rotor members a second alternating magnetic flux which cooperates with the first magnetic flux to produce a torque on the rotor member tending to rotate said shaft in one direction, and means for inducing in the second of said rotor members a second alternating magnetic flux which cooperates with the first magnetic flux induced therein to produce a torque on the second rotor member tending to rotate said shaft in the opposite direction, means for variably controlling the amplitude of one of said second magnetic fluxes in accordance with variations in temperature of the heating medium at the inlet side of said exchanger, and means for variably controlling the amplitude of the other second magnetic flux in accordance with variations in temperature of the heating medium at the outlet side of said exchanger.

4. In a heat metering system, the combination of a heat exchanger having inlet and outlet conduits for passing a heating medium therethrough, an integrating register mechanism having a rotary shaft for operating the same, a pair of conductive armatures mounted on said shaft in spaced relation, a winding interposed between said armatures and arranged to induce eddy currents in both armatures, means for energizing said winding with alternating current variable in magnitude in accordance with variations in the rate of flow of heating medium through said exchanger, a pair of additional windings associated respectively with said armatures and arranged to induce in the paths of said armatures magnetic fields which react with the eddy currents induced therein in opposite directions whereby said armatures tend to rotate said shaft in opposite directions, an alternating current energizing circuit for each of said additional windings, and means included in one of said energizing circuits for varying the magnitude of the current supplied to one of said additional windings in accordance with variations in temperature of the medium flowing through said exchanger.

5. A heat metering system according to claim 4 in which the alternating current for energizing the remaining additional winding is maintained substantially constant in magnitude.

6. A heating metering system according to claim 4 in which the energizing circuit of one of said additional windings includes means for varying the amplitude of the current therein in accordance with variations in temperature of the medium at the inlet side of said exchanger, and the energizing circuit of the other additional winding includes means for varying the amplitude of the current therein in accordance with variations in temperature of the medium at the outlet side of said exchanger.

CECIL L. JOHNSON.